(12) United States Patent
Oh et al.

(10) Patent No.: US 7,232,553 B2
(45) Date of Patent: Jun. 19, 2007

(54) PLATE TYPE STEAM REFORMER

(75) Inventors: Young-Sam Oh, Inchon (KR); Young-Soon Baek, Inchon (KR); Taek-Yong Song, Inchon (KR); Sang-Eon Park, Daejon (KR); Ki-Won Jun, Daejon (KR); Ri-Sang Choi, Busan (KR)

(73) Assignees: Korea Gas Corporation, Gyunggi-do (KR); Korea Research Institute of Chemical Technology, Daejon (KR)

( * ) Notice: Subject to any disclaimer, the term of this patent is extended or adjusted under 35 U.S.C. 154(b) by 568 days.

(21) Appl. No.: 10/136,287

(22) Filed: May 2, 2002

(65) Prior Publication Data

US 2004/0013586 A1    Jan. 22, 2004

(30) Foreign Application Priority Data

Nov. 29, 2001    (KR)    ............................... 2001-75062

(51) Int. Cl.
| | |
|---|---|
| *B01J 8/04* | (2006.01) |
| *B01J 10/00* | (2006.01) |
| *B01J 19/00* | (2006.01) |
| *B01J 7/00* | (2006.01) |
| *C10J 3/84* | (2006.01) |

(52) U.S. Cl. ...................... 422/191; 422/188; 422/189; 422/190; 422/187; 422/198; 422/204; 422/236; 48/61; 48/62 R; 48/127.9; 48/128; 48/75; 48/198.7

(58) Field of Classification Search ................ 422/195, 422/191, 192, 148, 200; 429/12, 17, 19; 252/273, 107, 110; 423/359; 48/127; 208/156
See application file for complete search history.

(56) References Cited

U.S. PATENT DOCUMENTS

| | | | | |
|---|---|---|---|---|
| 4,657,826 | A * | 4/1987 | Tajima ........................ | 429/12 |
| 5,270,127 | A * | 12/1993 | Koga et al. ................... | 429/17 |
| 5,690,763 | A * | 11/1997 | Ashmead et al. ............. | 156/60 |
| 5,938,800 | A * | 8/1999 | Verrill et al. ............... | 48/127.9 |
| 6,376,114 | B1 * | 4/2002 | Bonville et al. ............. | 429/19 |
| 6,585,785 | B1 * | 7/2003 | Warren et al. ............. | 48/127.9 |
| 2002/0088740 | A1 * | 7/2002 | Krause et al. ................ | 208/46 |
| 2003/0008183 | A1 * | 1/2003 | Hsu ............................. | 429/19 |

* cited by examiner

*Primary Examiner*—Glenn Caldarola
*Assistant Examiner*—Kaity Handal
(74) *Attorney, Agent, or Firm*—Egbert Law Offices

(57) ABSTRACT

Disclosed is a plate type steam reformer comprising a plate type burner capable of heating a broad area of a reactor as a heat source, positioned on a bottom of the reformer; a reforming reactor requiring a relatively high temperature, positioned over the burner; a high temperature water gas shift reactor requiring a relatively moderate temperature, positioned over the reforming reactor; a low temperature water gas shift reactor requiring a relatively low temperature, positioned over the high temperature water gas shift reactor; and dividing plates positioned between the above three reactors and between the reforming reactor and the burner such that combustion exhaust gas produced in the burner supplies heat to the above reactors.

10 Claims, 8 Drawing Sheets

PLATE TYPE STEAM REFORMER

BACKGROUND OF THE INVENTION

1. Field of the Invention

The present invention relates, in general, to a plate type steam reformer and, in particular, to a compact plate type steam reformer having a modularized structure, which can generate steam as well as heat a reforming reactor by use of heat from a burner, preheat high and low temperature water gas shift reactors by use of remaining waste heat after the reforming reactor is sufficiently heated, and properly control high and low temperature water gas shift reactors in temperature by positioning dampers in a flow path of exhaust gas to control a flow amount of the exhaust gas flowing in contact with exterior surfaces of reactors or by introducing cool air from outside to exterior surfaces of reactors.

2. Description of the Prior Art

Hydrogen has been generally used in the chemical engineering industry for processes such as desulfurization of crude oil and production of ammonia or chemical fertilizer, in the food processing industry for things such as production of low fat margarine, and in the metallurgical and iron industry for heat treating metal, and can also be applied to fuel for an automobile and a fuel cell as well as produce semiconductors, glass and optical fiber.

Recently, the demand has gradually increased for devices capable of continuously supplying hydrogen in the spot such as in the fuel cell or a hydrogen car. In practice, hydrogen is mostly produced by reforming natural gas or hydrocarbon, and also by reformation of naphtha, gasification of coal, electrolysis of water, and biomass.

Meanwhile, raw material may be reformed by various reforming processes such as steam reforming, oxygen reforming, and steam-oxygen mixed reforming processes, and in commercial use, hydrogen is mostly produced by the steam reforming process.

Used in the steam reforming process, a reformer generally comprises a steam generator, a desulfurizer, a reforming reactor, and high and low temperature water gas shift reactors. The reformer may further comprise a device for oxidizing carbon monoxide so as to effectively remove carbon monoxide with the purpose of using the reformer as a hydrogen source for the fuel cell, and a PSA (Pressure Swing Adsorption) device for providing high purity hydrogen by removing carbon dioxide and other impurities.

With reference to FIG. 1, the conventional reformer used in a large hydrogen plant, comprising a tube type reactor in a large furnace is illustrated, in which a reforming reaction is accomplished by 60 to 70% heat efficiency at a high temperature of 900 to 1000° C. Also, a reforming reactor, high and low temperature water gas shift reactors, a heat exchanger, and a steam generator are separately positioned outside of the reformer, and thus steam reforming process is large, complicated, and total heat efficiency is low due to heat loss from pipes.

Because a reforming reaction, and high and low temperature water gas shift reactions have different reactivities depending on temperatures of catalytic beds, respectively, each reactor has an optimum operation temperature. For example, the optimum operation temperature for the steam reforming reaction, which is a strong endothermic reaction, ranges from 700 to 900° C., and the optimum temperatures for the high and low temperature water gas shift reactions, which are weak exothermic reactions, range from 400 to 500° C. and 200 to 300° C.

Because the reforming reaction is an endothermic reaction, heat should be applied to the reforming reactor by a heat source such as a burner and electric heating element during the reforming reaction. In the case of using the burner as the heat source, waste heat from reforming reaction can be partially recovered through a heat exchanger but most of the heat cannot be utilized and is wasted.

High and low temperature water gas shift reactions, which are weak exothermic reactions, initially require a heat source such as the electric heating element in order to properly preheat the high and low temperature water gas shift reactors. However, in practice, preparative time for cooling is about 2 hours when the reactors are used according to the above prior art, and so the above prior art cannot be applied to the fuel cell or another hydrogen supply apparatus which requires a short preheating time.

Therefore, to avoid the above disadvantages, much effort has been made to produce a device comprising the reforming reactor and the high and low temperature water gas shift reactors, which is structurally simple and compact in size, as well as has a short preheating time and high energy efficiency.

For example, reference may be made to U.S. Pat. Nos. 6,203,587 and 5,733,347, which disclose a fuel gas steam reformer assemblage which is compact and lighter in weight than conventional steam reformer assemblages used in fuel cell power plants. The fuel gas steam reformer having a plate type structure is characterized in that any one side of the reformer is heated by a catalyst combustion type heater and the structure of the reformer is symmetric to be effectively heated by a reaction heat. In addition, the reformer cannot produce steam by itself because it does not have a device for removing carbon monoxide, and so the reformer needs some peripheral devices, thereby the fuel gas steam reformer has disadvantages in that it forms a bulky assembly in conjunction with peripheral devices.

In addition, U.S. Pat. Nos. 5,609,834, 5,180,561, and 5,015,444 introduce a plate type reformer assembly, in which a catalyst combustion burner is a heat source and heat is effectively applied from the heat source to a reforming catalyst bed. However, this assembly does not comprise a steam generator and water gas shift reactor, and so the assembly requires additional devices, therefore the assembly cannot be sufficiently compact.

Furthermore, Korean Pat. Laid-open Publication Nos. 1997-25688 and 1999-14655 disclose a reformer for generating hydrogen from natural gas. The former has disadvantages in that the reformer does not comprise a water gas shift reactor even though heat produced from catalytic combustion in a cylindrical reformer is used in a reforming reaction and steam generation, and thus the reformer cannot have a sufficiently compact structure. In addition, the later discloses a reformer, in which steam is generated, fuel is preheated by a single-type catalyst combustion burner, and exhaust gas heats a desulfurizer. However, because high and low temperature water gas shift reactors should be separately positioned outside of the reformer, an assembly needed to produce hydrogen becomes not compact but bulky.

As described above, when water gas shift reactors, a heat exchanger, and a steam generator are separately positioned from a reforming reactor, a reforming assembly which is compact in size and has a high energy efficiency, cannot be obtained. Therefore, a device integrating reactors is needed in order to reduce the size of the reforming assembly.

Korean Pat. Laid-open Publication No. 2000-22546 discloses a reforming device integrating reactors, in which cylindrical or quadrilateral reactors are concentrically positioned, an innermost space is for combustion, a reforming reactor is adjacent outside of the space for combustion, and a water gas shift reactor and oxidation reactor for removing carbon monoxide are positioned outside of the reforming reactor. According to this invention, a catalyst combustion burner or flame combustion burner is used as a heat source, and steam is produced by supplying water into a coil-shaped heat exchanger or a flow path positioned on an exterior wall of a burner in order to use combustion exhaust gas. Additionally, direction of flow of the exhaust gas is changed by opening and/or closing one or two covers positioned at a flow path of the exhaust gas, and thus a flow amount of the exhaust gas flowing into the water gas shift reactor and the oxidation reactor is controlled, thereby temperatures of reactors are controlled.

Accordingly, fuel is effectively used because heat occurring in combustion of fuel is applied to the steam generator for generating steam and the reforming reactor, and energy is effectively utilized because waste heat is applied to preheat water gas shift reactors.

However, even though inventors of this prior art assert that heat is effectively utilized because reactors are concentrically positioned, the reforming device has disadvantages in that the exhaust gas cannot naturally and sufficiently flow into a desired space because combustion exhaust gas flows vertically, and so temperatures of reactors are not effectively controlled and heat may accumulate in reactors. As for utilizing exhaust gas, opening and/or closing means, positioned at an exhaust port for controlling temperatures of the water gas shift reactor and the oxidation reactor, are complicated because the opening and/or closing means have a dual structure.

Other disadvantages of the above reforming device are that a temperature of a catalytic bed is difficult to uniformly maintain because a portion of the catalytic bed, to which fuel and air are applied, is highest in temperature and a temperature gradient is longitudinally formed in the catalytic bed owing to catalytic combustion when heat is applied through a catalytic combustion process, as well a burner should be used in order to provide additional heat to reactors because the catalyst combustion burner is restricted in volume and cannot provide sufficient heat to the reactors, and so the reforming device becomes complicated and bulky.

In the case of using the flame burner, a sufficient combustion space is needed because the cylindrical reforming device is vertically positioned, and so the device becomes larger.

SUMMARY OF THE INVENTION

Therefore, it is an object of the present invention to provide a plate type steam reformer, which is compact in size, and can effectively control temperatures of reactors as well as improve energy efficiency. The plate type steam reformer becomes compact in size and can effectively utilize energy by stacking reactors constituting a device for generating hydrogen, and it can also effectively control temperatures of reactors by positioning dampers in a flow path of exhaust gas to control a flow amount of exhaust gas flowing in contact with exterior surfaces of reactors.

Based on the present invention, the above object can be accomplished by a provision of a plate type steam reformer, which is compact in size, comprising a plate type burner capable of heating reactors with a broad area as a heat source, positioned in a bottom of the reformer; a reforming reactor requiring a relatively high temperature, positioned over the burner; a high temperature water gas shift reactor requiring a relatively moderate temperature, positioned over the reforming reactor; a low temperature water gas shift reactor requiring a relatively low temperature, positioned over the high temperature water gas shift reactor; and a plurality of dividing plates positioned between the above three reactors and between the reforming reactor and the burner such that high temperature combustion exhaust gas occurring in the burner flows in contact with exterior surfaces of the above three reactors and supplies heat to the above three reactors.

The burner is a plate type metal fiber burner and has a heat exchanger consisting of a cooling coil positioned on an exterior wall thereof so as not to be excessively heated.

The reforming reactor, and the high and low temperature water gas shift reactors have pleat fins attached on external surfaces thereof to broaden a heat exchange area with exhaust gas, and are respectively partitioned into two or more compartments to increase retention time of a reactant in the reactors.

The reforming reactor, and the high and low temperature water gas shift reactors have dampers and dampers are controlled such that the reactors are heated or preheated by controlling high temperature combustion exhaust gas flowing in contact with external surfaces of the reactors.

The reformer has a cooling fan, which is a cylindrical blower, or an air inlet positioned on an external wall thereof so as to control temperatures of the high and low temperature water gas shift reactors in conjunction with the damper by introducing cooling air from an atmosphere through the cooling fan or the air inlet into the reformer when temperatures of the water gas shift reactors rise due to heat produced from the water gas shift reactors during a reaction.

The steam generator is sandwiched between the burner and the reforming reactor, or between the reforming reactor and the high temperature water gas shift reactor as well as between the burner and the reforming reactor.

The plate type steam reformer further comprises a desulfurizer for desulfurizing natural gas and an oxidation reactor for removing a small amount of carbon monoxide and hydrocarbon as well as the reforming reactor and the high and low temperature water gas shift reactors. The desulfurizer is positioned between the reforming reactor and the water gas shift reactor, and the oxidation reactor is positioned under or over water gas shift reactors.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

A reformer of the present invention comprises reactors 3, 4, and 5 having a proper shape and structure so that heat produced from a burner 1 is used to preheat high and low temperature water gas shift reactors 4 and 5 and to heat a reforming reactor 3.

Figure 3A:
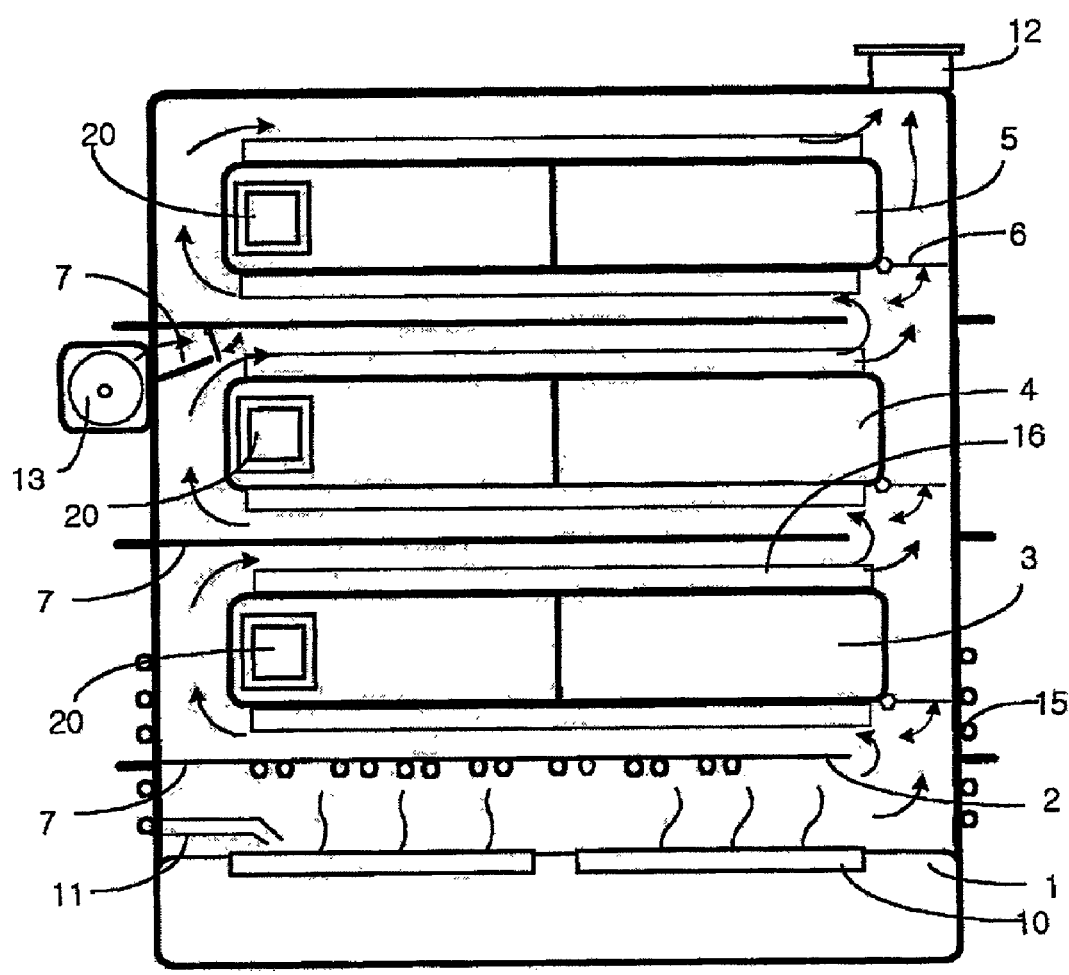
FIGS. 3a to 3c are rear, front, and side cutaway views of the plate type steam reformer according to a first embodiment of the present invention, respectively.
Figure 3B:
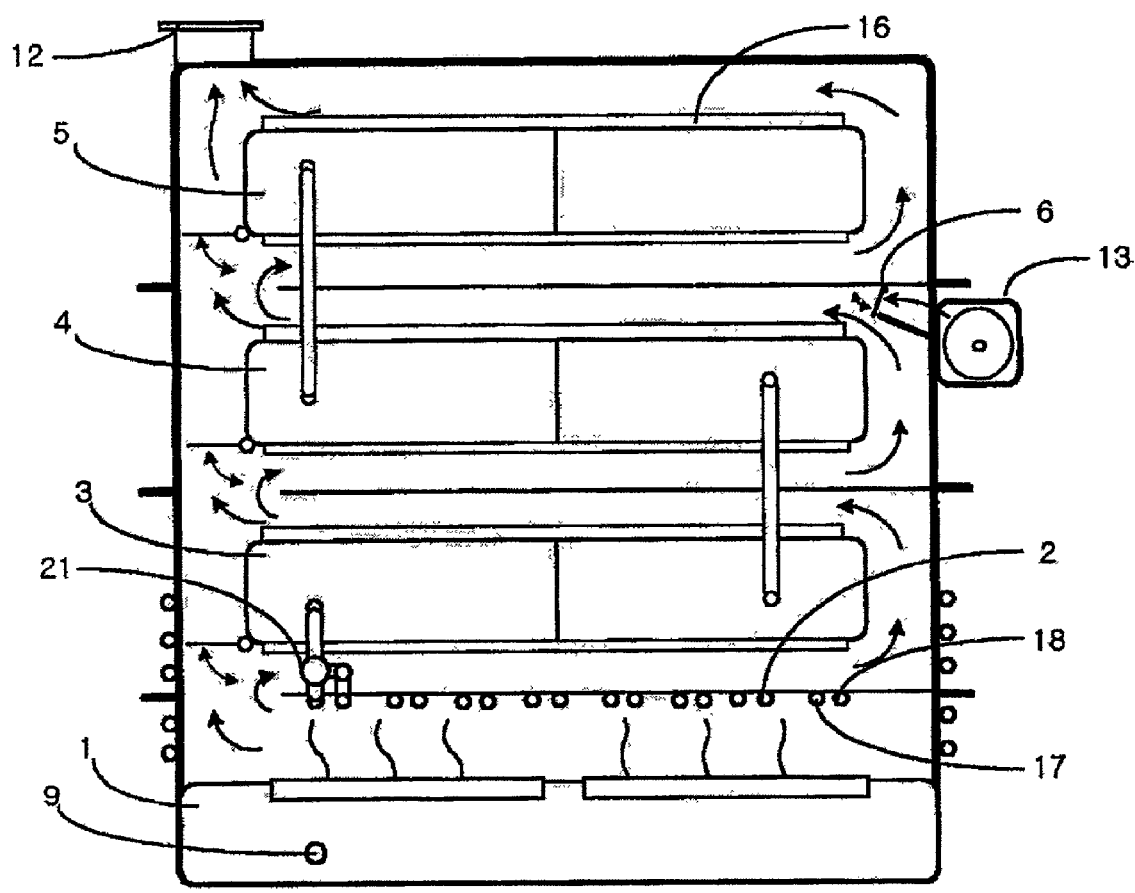
Figure 3C:
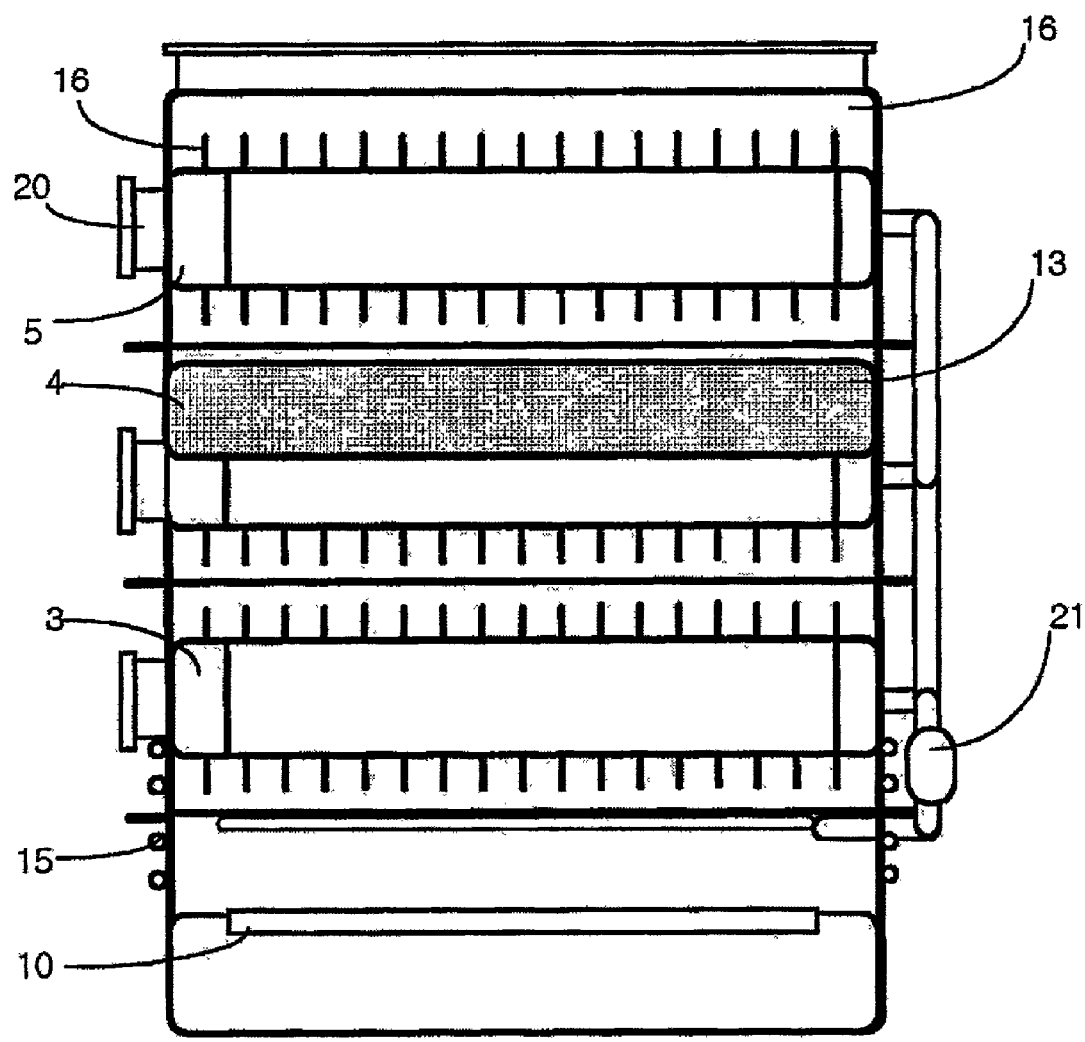

According to a first embodiment of the present invention shown in FIGS. 3a to 3c, the reformer has the burner 1 capable of heating reactors with a broad area and three rectangular reactors 3, 4, and 5, all of which are positioned parallel to one another. The plate type burner 1, as a heat source, is positioned in a bottom portion of the reformer, and a steam generator 2 for generating steam and preheating raw material is positioned in conjunction with a dividing plate 7 for separating a flow path of combustion exhaust gas over the burner 1.

In other words, the reforming reactor 3 is positioned over the steam generator 2, the dividing plate 7 for separating the flow path of the combustion exhaust gas is positioned over the reforming reactor 2, a high temperature water gas shift reactor 4 is positioned over the dividing plate 7, another dividing plate 7 for separating the flow path of the combustion exhaust gas is positioned over the high temperature water gas shift reactor 4, a low temperature water gas shift reactor 5 is positioned over the dividing plate 7, and a flue 12 is positioned over the low temperature water gas shift reactor 5.

In addition, passageways are formed between reactors and dividing plates 7, and three dampers 6 for selectively controlling a directional flow of combustion exhaust gas are positioned at one end of each reactor. The damper 6 properly controls a flow amount of combustion exhaust gas passing through the passageway, so that temperatures of reactors are separately controlled.

When the temperature is not sufficiently controlled by the damper 6, a cooling fan 13, a cylindrical blower for introducing external air into the reformer, may be set on an exterior wall of the reformer, thereby temperatures of reactors 3, 4, and 5 can be effectively controlled.

According to the first embodiment, the metal fiber burner 1 measuring 110×160 mm is positioned in the bottom portion of the reformer, so that heat produced from the burner 1 is supplied to the reforming reactor 2, and high and low temperature water gas shift reactors 4 and 5 are preheated early in the reformation. In addition, the perforate dividing plate 7 measuring 190×200 mm, in contact with the steam generator 2 for converting water into steam and preheating natural gas, is positioned over the metal fiber burner 1, and the hexahedron-shaped passageway with a volume of 1400 cc is formed on the dividing plate 7, which is partitioned into two spaces, which, if necessary, communicate with each other.

Furthermore, the reforming reactor 3 has pleat fins 16 positioned on the interior and exterior surface thereof for increasing efficiency of heat exchange. The dividing plate 7 measuring 190×200 mm is used for changing a directional flow of exhaust gas and is positioned over the reforming reactor 3, the high temperature water gas shift reactor 4 having the same shape as the reforming reactor 3 but with a volume of 2300 cc is positioned over the dividing plate 7, the dividing plate 7 measuring 190×200 mm over the high temperature water gas shift reactor 4, the low temperature water gas shift reactor 5 having the same shape and volume as the high temperature water gas shift reactor 4 over the dividing plate 7, and the flue 12 for releasing combustion exhaust gas over the low temperature water gas shift reactor 5. Also, dampers 6 for changing the directional flow of combustion exhaust gas, the cooling fan 13 for controlling temperatures of high and low temperature water gas shift reactors 4 and 5, and a heat exchanger 15, i.e. cooling coil, for preventing a circumference of the burner 1 from being excessively heated and for recovering heat partially constitute the reformer.

That is to say, the reformer of the present invention has a stacked structure comprising the burner 1 for supplying heat into reactors 3, 4, and 5, the steam generator 2 for converting water into high temperature steam, the reforming reactor 3 for producing synthetic gas by reacting hydrocarbon (hereinafter, refer as "natural gas") with steam, and high and low temperature water gas shift reactors 4 and 5 for reducing a concentration of carbon monoxide by reacting carbon monoxide among the synthetic gas produced from the reforming reactor 3 with steam.

The reformer of the present invention may further comprise a desulfurizer (not shown in drawings) for desulfurizing natural gas and an oxidation reactor (not shown in drawings) for removing a small amount of carbon monoxide and hydrocarbon in addition to the reforming reactor and the high and low temperature water gas shift reactors. The desulfurizer may be positioned between the reforming reactor 3 and the water gas shift reactor 5, and the oxidation reactor may be positioned under or over water gas shift reactors 4 and 5.

The burner 1 is a metal fiber burner using a quadrangle-shaped metal fiber. When a mixed gas of air and natural gas, i.e. fuel gas, is introduced from outside of the burner 1 through the natural gas inlet 17, the mixture gas is uniformly supplied into the burner 1 through a dispersion plate 10 positioned under the burner 1, and ignited by a spark plug 11 positioned over the burner 1 to be burned, the burner 1 thereby produces heat.

Heat produced from the burner 1 is directly applied to the steam generator 2 positioned over the burner 1, high temperature exhaust gas then flows through a space between the steam generator 2 and the interior wall of the reformer and heats the reforming reactor 3 positioned over the steam generator 2. When a temperature of the reforming reactor 3 does not reach a desired temperature, the damper 6 is opened and thus high temperature combustion exhaust gas flows into the reforming reactor 3 and continuously applies heat into the reforming reactor 3.

On the other hand, when the temperature of the reforming reactor 3 reaches a set temperature, the damper 6 is closed and the high temperature combustion exhaust gas flows directly to the high temperature water gas shift reactor 4, and thus the reforming reactor 3 is no longer heated, thereby the reforming reactor 3 is properly controlled in temperature.

Combustion exhaust gas, the temperature of which is reduced when it flows in contact with an exterior surface of the reforming reactor 3, flows to the high temperature water gas shift reactor 4 and heats it. When the temperature of the high temperature water gas shift reactor 4 rises over the set temperature, the damper 6 positioned at an end of the high temperature water gas shift reactor 4 is closed and then, exhaust gas flows directly to the low temperature water gas shift reactor 5 without passing through the high temperature water gas shift reactor 4.

Likewise, exhaust gas passing through the high temperature water gas shift reactor 4 flows to the low temperature water gas shift reactor 5 and heats it, and when it's temperature rises over the set temperature, the damper 6 positioned at an end of the low temperature water gas shift reactor 5 is partially or totally closed and thus exhaust gas flows to the flue 12, thereby the low temperature water gas shift reactor 5 is properly controlled in temperature.

Because the reformation reaction is an endothermic reaction but the conversion reaction is an exothermic reaction, the low temperature water gas shift reactor 5 emits heat during conversion of carbon monoxide. When the temperature of the low temperature water gas shift reactor 5 rises, even though exhaust gas directly flows to the flue 12 without through the low temperature water gas shift reactor 5, the temperature of the low temperature water gas shift reactor 5 is controlled by introducing cold air from outside of the reformer into the reformer through the cooling fan 13, which is a blower positioned on an exterior surface of the reformer, or at an air inlet 14.

Meanwhile, water fed into the reformer through a water inlet 18, which is raw material used to produce hydrogen, is mixed with natural gas in a proper mole ratio and preheated by the heat exchanger 15 positioned around the burner 1, then passes through the steam generator 2, thereby a mixture of high temperature steam and natural gas is produced. The resulting mixture is fed into the reforming reactor 3. The mixture of steam and natural gas is converted into a mixture of hydrogen, carbon monoxide, and unreacted gas in the presence of a catalyst fed through a catalyst inlet 20 at high temperature in the reforming reactor 3, then the converted gas mixture flows to high and low temperature water gas shift reactors 4 and 5.

In high and low temperature water gas shift reactors 4 and 5, carbon monoxide is reacted with remaining steam to produce hydrogen and carbon dioxide, then a gas consisting of hydrogen, carbon dioxide, and a small amount of carbon monoxide and natural gas is released through the hydrogen outlet 19. The released gas mixture can be purified to become high purity hydrogen gas through a separating apparatus such as PSA.

Reformation reaction was conducted according to the first embodiment, resulting in the finding that a preheating time of the reformer is greatly reduced to 40 min from 2 hours which is the required preheating time for a conventional reformer, and releasing gas is composed of hydrogen at 82.31%, carbon monoxide at 1.61%, methane at 0.24%, carbon dioxide at 15.84% in concentration based on dry gas at an outlet of the reformer in a steady-state when steam and methane is fed into the reformer in a mole ratio of 1:3.

Figure 4:
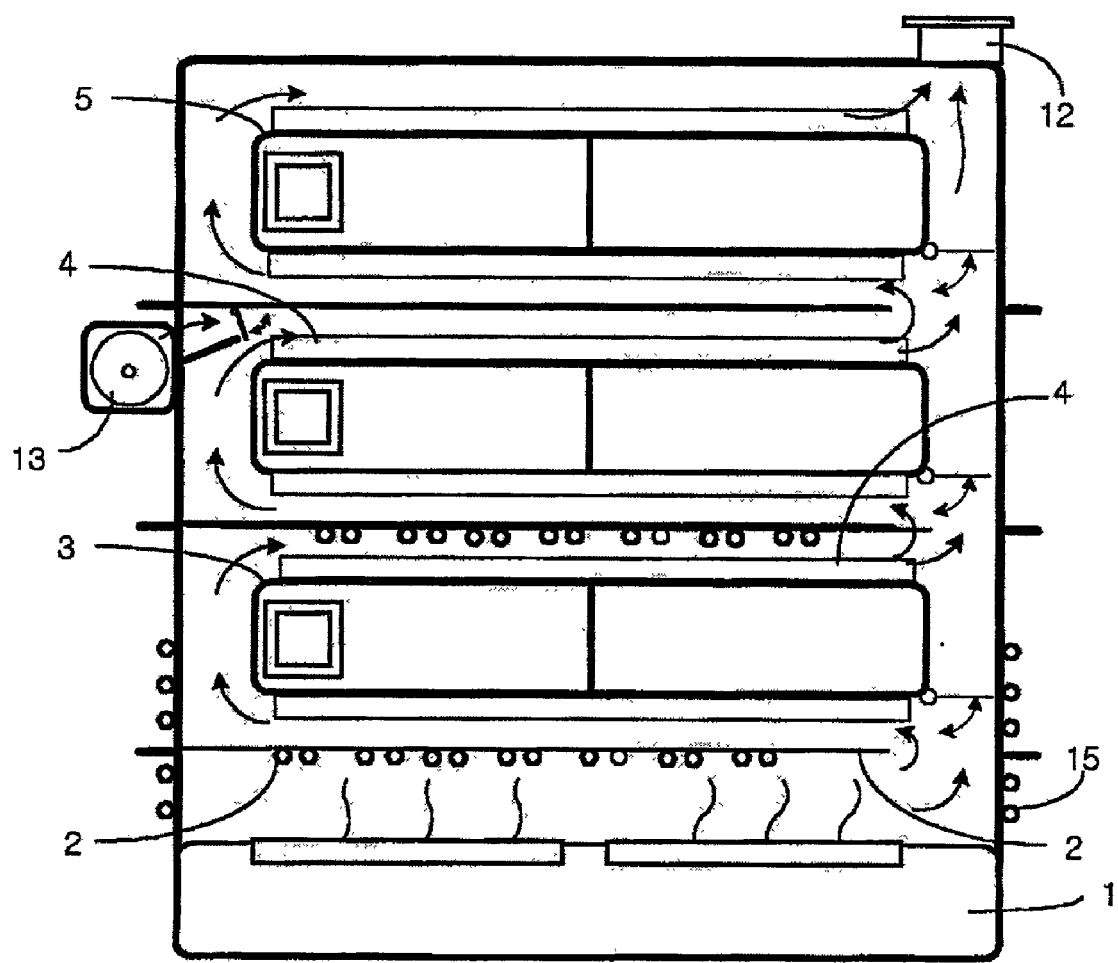
FIG. 4 is cutaway view of the plate type steam reformer according to a second embodiment of the present invention.
Figure 5:
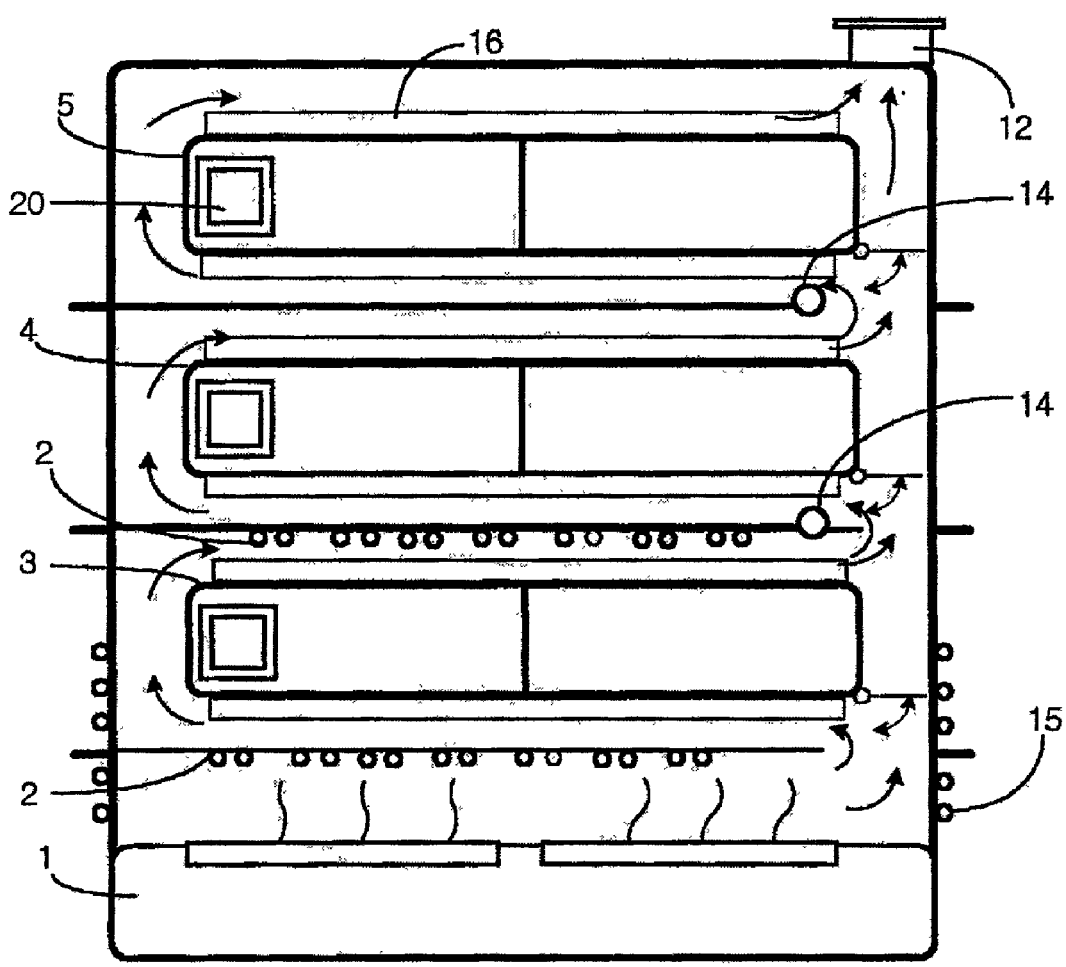
FIG. 5 is cutaway view of the plate type steam reformer according to a third embodiment of the present invention.

The first embodiment illustrates a basic type steam reformer of the present invention, and other type steam reformers are illustrated in FIGS. 4 and 5.

Figure 1:
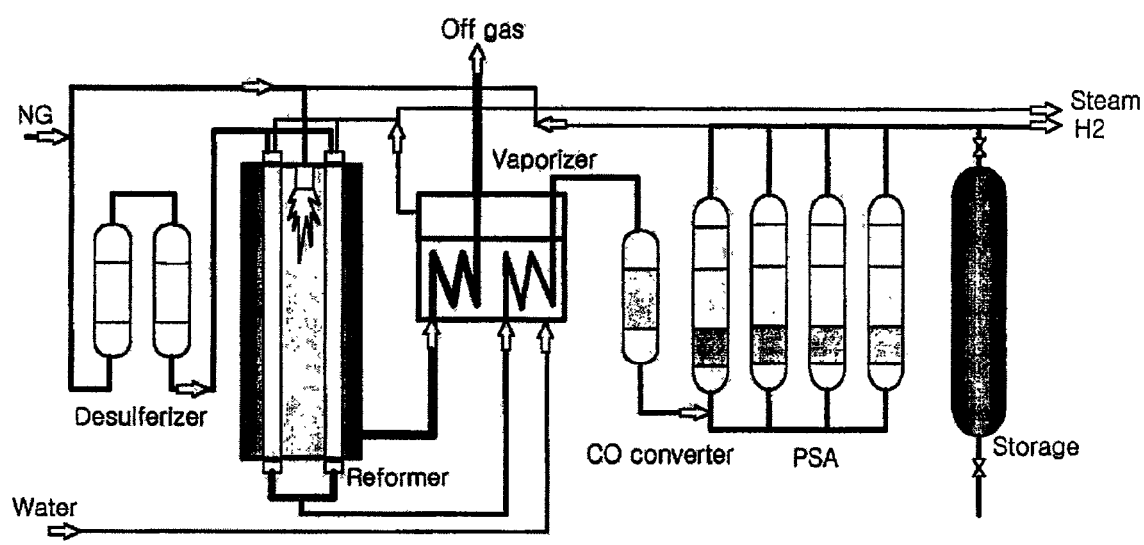
FIG. 1 schematically illustrates a reformation process using a conventional steam reformer.
Figure 2A:
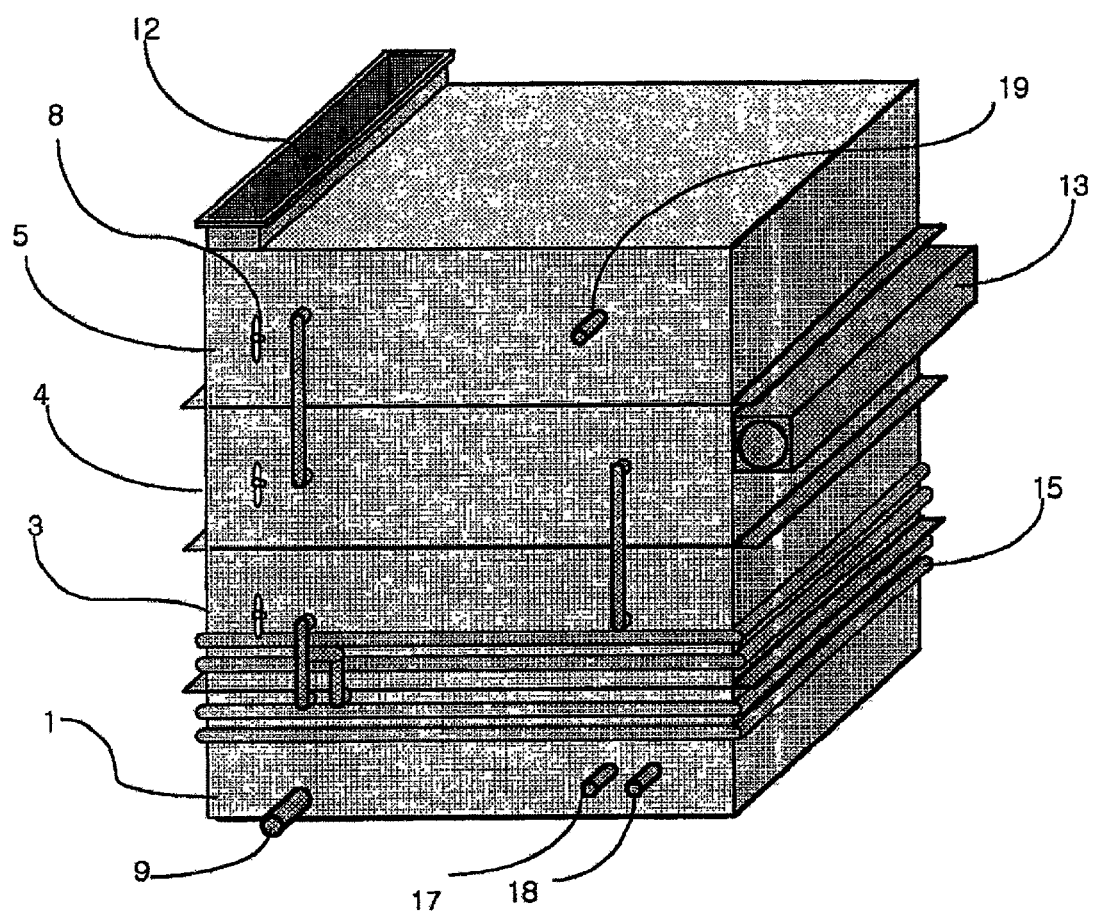
FIGS. 2a and 2b are front and rear perspective views of a plate type steam reformer according to the present invention.
Figure 2B:
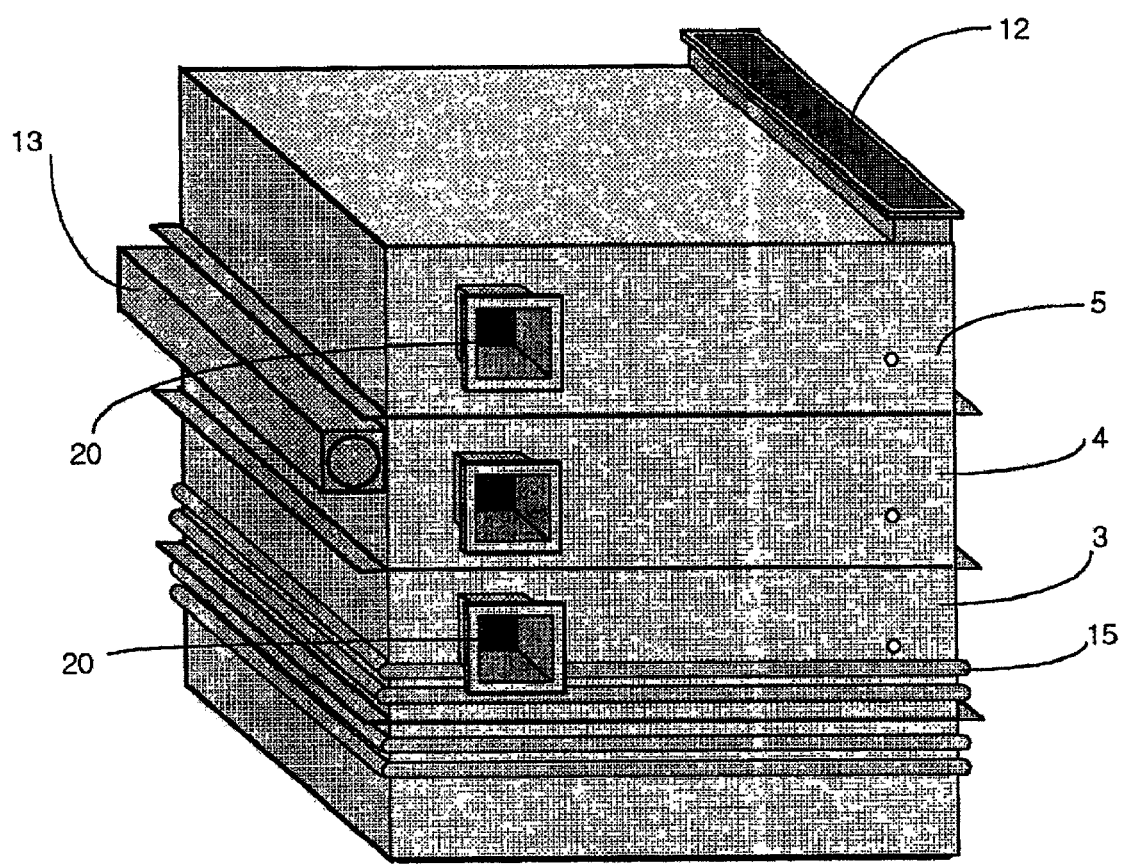

According to a second embodiment of the present invention, the reformer is the same as the first embodiment of FIG. 1 except that steam generators 2 may be simultaneously positioned between the burner 1 and the reforming reactor 3, and between the reforming reactor 3 and the high temperature water gas shift reactor 4, as shown in FIG. 4.

According to a third embodiment of the present invention, the reformer comprises the air inlet 14 for cooling high and low temperature water gas shift reactors 4 and 5, instead of the cooling fan 13 of the reformer in FIG. 1, as shown in FIG. 5.

As described above, a plate type steam reformer according to the present invention has advantages in that high and low temperature water gas shift reactors as well as a reforming reactor are effectively heated by stacking the reactors, and a temperature of each reactor is properly controlled by positioning dampers in a flow path of exhaust gas to control a flow amount of the exhaust gas flowing in contact with exterior surfaces of reactors, thereby obtaining gas which is abundant in hydrogen.

In other words, the plate type steam reformer of the present invention is advantageous in that the steam reformer becomes compact in size because utility apparatuses become unnecessary through integrating reactors constituting a device for generating hydrogen, heat is uniformly applied to reactors and it is easy to utilize heat because heat naturally flows by stacking reactors, and energy is saved and effectively utilized because remaining waste heat, after the reforming reactor is sufficiently heated, is used without utilizing an auxiliary heating source for preheating high and low temperature water gas shift reactors. Additionally, preheating time is greatly reduced from 2 hours to 30 min.

It is thus seen that the objects set forth above, as made apparent from the preceding description, are efficiently attained and, since certain changes may be made in carrying out the above method and in the construction set forth without departing from the spirit and scope of the invention, it is intended that all matter contained in the accompanying drawing shall be interpreted as illustrative, and not in a limiting sense.

What is claimed is:

1. A compact plate-type steam reformer comprising:
a housing;
a plate-type burner means positioned on a bottom of said housing;
a reforming reactor requiring at least a first temperature for operation, said reforming reactor positioned over said burner;
a first water gas shift reactor requiring at least a second temperature for operation, said first water gas shift reactor positioned over said reforming reactor in said housing, said second temperature being less than said first temperature;
a second water gas shift reactor requiring at least a third temperature for operation, said second water gas shift reactor positioned over said first water gas shift reactor in said housing, said third temperature being less than said second temperature, said burner means for heating said reforming reactor and said first and second water gas shift reactors, said burner means being a broad area heat source;
a first dividing plate positioned in a space between said reforming reactor and said first water gas shift reactor;
a second dividing plate positioned in a space between said first water gas shift reactor and said second water gas shift reactor;
a third dividing plate positioned in a space between said burner means and said reforming reactor, said burner means for producing combustion exhaust gas that flows over said dividing plates and in contact with an exterior surface of said reactors so as to supply heat to said reactors, each of said dividing plates having an opening only at one side thereof;
a first damper hingedly positioned at one end of said reforming reactor so as to selectively move between a first position closing a space between said reforming reactor and an inner wall of said housing and a second position away from said inner wall of said housing so as to allow the exhaust gas to pass therethrough;
a second damper hingedly positioned at one end of said first water gas shift reactor so as to selectively move between a first position closing a space between said first water gas shift reactor and said inner wall of said housing and a second position away from said inner wall of said housing so as to allow the exhaust gas to pass therethrough; and a third damper hingedly positioned at one end of said second water gas shift reactor so as to selectively move between a first position closing a space between said second water gas shift reactor and an inner wall of said housing and a second position away from said inner wall of said housing so as to allow the exhaust gas to pass therethrough, each of said first damper and said second damper and said third damper suitable for controlling an amount of the exhaust gas flowing around each of said reactors.

2. The reformer of claim 1, said burner means comprising a metal fiber burner, the reformer further comprising:
a cooling coil positioned on an exterior wall of said housing.

3. The reformer of claim 1, each of said reactors having pleat fins attached to exterior surface thereof.

4. The reformer of claim 1, further comprising:
a cooling means positioned on an external wall of said housing for controlling temperatures of said first and second water gas shift reactors, said cooling means for passing cooling air into said housing when a temperature of said first and second water gas shift reactors exceeds a desired temperature level.

5. The reformer of claim 4, said cooling means comprising a cooling fan.

6. The reformer of claim 5, said cooling fan comprising a cylindrical blower.

7. The reformer of claim 4, said cooling means comprising an air inlet.

8. The reformer of claim 1, further comprising:
a steam generator sandwiched between said burner means and said reforming reactor.

9. The reformer of claim 1, further comprising:
a steam generator sandwiched between said reforming reactor and said first water gas shift reactor.

10. The reformer of claim 1, further comprising:
a desulfurizing means positioned between said reforming reactor and said first water gas shift reactor, said desulfurizing means for desulfurizing natural gas in said housing.

* * * * *